US010135208B2

(12) United States Patent
Reed et al.

(10) Patent No.: US 10,135,208 B2
(45) Date of Patent: Nov. 20, 2018

(54) HINGED LOW PROFILE MODULAR ELECTRICAL POWER BAR FOR A VEHICLE

(71) Applicant: Ford Global Technologies, LLC, Dearborn, MI (US)

(72) Inventors: Glenn Richard Reed, Ann Arbor, MI (US); Senate Ghanim, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/415,279

(22) Filed: Jan. 25, 2017

(65) Prior Publication Data
US 2018/0212379 A1 Jul. 26, 2018

(51) Int. Cl.
*H01R 25/14* (2006.01)
*H01R 4/48* (2006.01)
*B60R 16/03* (2006.01)

(52) U.S. Cl.
CPC ........... *H01R 25/145* (2013.01); *B60R 16/03* (2013.01); *H01R 4/48* (2013.01)

(58) Field of Classification Search
CPC .... H01R 35/04; H01R 13/645; H01R 25/162; H01R 25/145
USPC ........................... 439/31, 165, 640, 212, 213
See application file for complete search history.

(56) References Cited

U.S. PATENT DOCUMENTS

| | | | | |
|---|---|---|---|---|
| 4,450,495 A | * | 5/1984 | Naruki | G11B 25/063 224/674 |
| 4,922,064 A | * | 5/1990 | Price | E05D 11/00 200/61.7 |
| 5,196,987 A | * | 3/1993 | Webber | H01R 25/16 361/624 |
| 5,267,866 A | * | 12/1993 | Swift | H01R 35/04 439/31 |
| 5,390,075 A | * | 2/1995 | English | G06F 1/1616 16/386 |
| 5,783,779 A | * | 7/1998 | Graham | H02G 5/007 174/88 B |

(Continued)

FOREIGN PATENT DOCUMENTS

| | | |
|---|---|---|
| CN | 107482384 A | 12/1917 |
| CN | 202373931 U | 8/2012 |

(Continued)

OTHER PUBLICATIONS

Search Report dated Jul. 6, 2018 for GB Patent Application No. GB 1801020.7 (4 pages).

*Primary Examiner* — Tulsidas C Patel
*Assistant Examiner* — Marcus Harcum
(74) *Attorney, Agent, or Firm* — James P. Muraff; Neal, Gerber & Eisenberg LLP (57) ABSTRACT

Systems and apparatus are disclosed for a hinged low profile modular electrical power bar of a vehicle. An example disclosed vehicle power bar includes a connector including first and second sockets. The vehicle power bar also includes first and second pins. Additionally, the vehicle power bar includes a first busbar rotatably coupled to the connector via the first pin coupled to a first terminal of the first busbar and inserted into the first socket, and a second busbar rotatably coupled to the connector via the second pin coupled to a second terminal of the second busbar and inserted into the second socket.

19 Claims, 11 Drawing Sheets

(56) References Cited

U.S. PATENT DOCUMENTS

| | | | | |
|---|---|---|---|---|
| 7,758,358 | B1* | 7/2010 | Mier-Langner | H01R 25/142 |
| | | | | 362/219 |
| 7,766,660 | B1* | 8/2010 | Chang | H01R 13/506 |
| | | | | 439/11 |
| 9,178,203 | B2 | 11/2015 | Lev et al. | |
| 9,300,098 | B1* | 3/2016 | Michaud | H01R 4/30 |
| 9,324,981 | B2 | 4/2016 | Schmieder | |
| 2003/0091896 | A1 | 5/2003 | Watanabe et al. | |
| 2004/0074045 | A1* | 4/2004 | Winstead | H01R 35/04 |
| | | | | 16/2.1 |
| 2013/0171850 | A1 | 7/2013 | Mooney et al. | |

FOREIGN PATENT DOCUMENTS

| | | | | |
|---|---|---|---|---|
| DE | 4130861 | A1 | 3/1993 | |
| DE | 19641090 | A1 * | 4/1997 | ........... H01R 25/145 |
| DE | 102009018945 | A1 | 10/2010 | |
| WO | WO 2010099119 | A2 | 9/2010 | |

* cited by examiner

HINGED LOW PROFILE MODULAR ELECTRICAL POWER BAR FOR A VEHICLE

TECHNICAL FIELD

The present disclosure generally relates to vehicle power buses and, more specifically, a hinged low profile modular electrical power bar.

BACKGROUND

Vehicles have a power distribution system that runs the length of the car. Most often, a power bus bar contains a rigid solid core that is one piece that runs the full length of the vehicle cabin. However, the rigid power bar creates difficulty when they are shipped, handled, and installed. Additionally, as the shells of more vehicles are increasingly made of a non-conducting composite material, the power system is losing its return ground to chassis. As such, a second solid core is used as a ground return.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a hinged low profile modular electrical power bar of a vehicle. An example disclosed vehicle power bar includes a connector including first and second sockets. The vehicle power bar also includes first and second pins. Additionally, the vehicle power bar includes a first busbar rotatably coupled to the connector via the first pin coupled to a first terminal of the first busbar and inserted into the first socket, and a second busbar rotatably coupled to the connector via the second pin coupled to a second terminal of the second busbar and inserted into the second socket.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As disclosed below, a hinged low profile modular electrical power bar includes an insulated hinged joint with a power socket. The hinged joint links insulated bus bars (sometimes referred to herein as "busbars"). In some examples, the hinged low profile modular electrical power bar includes multiple joints linking three or more insulated bus bars. The hinged joint separates mechanical connection of the insulated bus bars from the electrical connection of the insulated bus bars to prevent terminal deformation or terminal spreading that causes high resistance or an open circuit. To separate the mechanical and electrical connections, the hinged joint uses different diameters of concentric pivots for the mechanical pivot points and the electrical pivot points. The electrical connection is formed by the electrical terminals of the bus bars being electrically coupled to a electrical joining connector via conducting rods through the bus bar electrical terminals and the corresponding terminals of the electrical joining connector. The mechanical connection is formed by an insulating jacket being coupled to insulating caps that are coupled to the portion of the bus bars.

Figure 1:
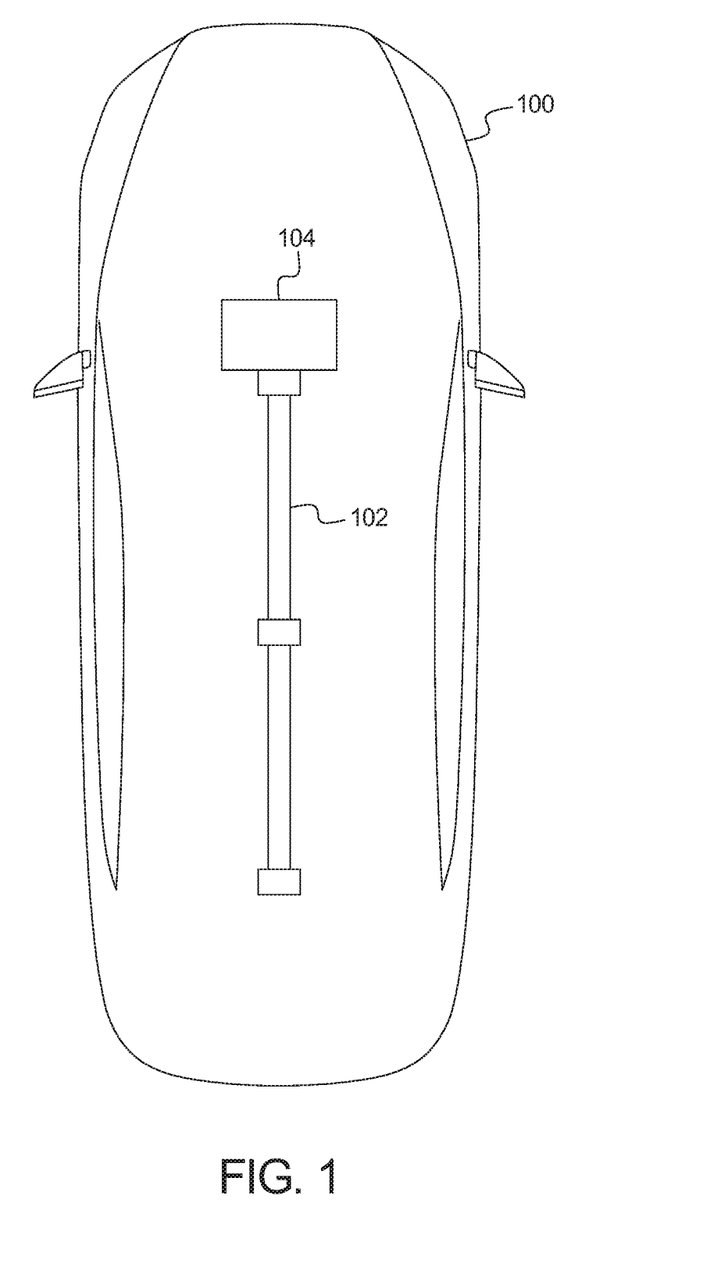
FIG. 1 illustrates a vehicle with a hinged low profile modular electrical power bar in accordance with the teachings of this disclosure.

FIG. 1 illustrates a vehicle 100 with a hinged low profile modular electrical power bar 102 (sometimes referred to as a "modular electrical power bar") in accordance with the teachings of this disclosure. The modular electrical power bar 102, when installed, runs the length of a cabin of the vehicle 100. In the illustrated example, the modular electrical power bar 102 is installed along the floor of the frame of the vehicle 100 to provide power connections to systems (e.g., sensors, electronic control units, infotainment systems, lighting, etc.) from the power management system 104 (e.g., batteries, an alternator, a regenerative breaking system, etc.) of the vehicle 100. As disclosed below, in some examples, multiple modular electrical power bars 102 are installed to provide one or more power buses (e.g., a 12V bus, a 48V bus, etc.) and/or a ground return (e.g., for vehicles 100 with a body made from a non-conducting composite material, etc.).

The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example of FIG. 1, the vehicle 100 is a car, however, in other examples, the vehicle 100 may be other types of vehicles, such as trucks, semitrailers, boats, aircraft, etc.

Figure 2:
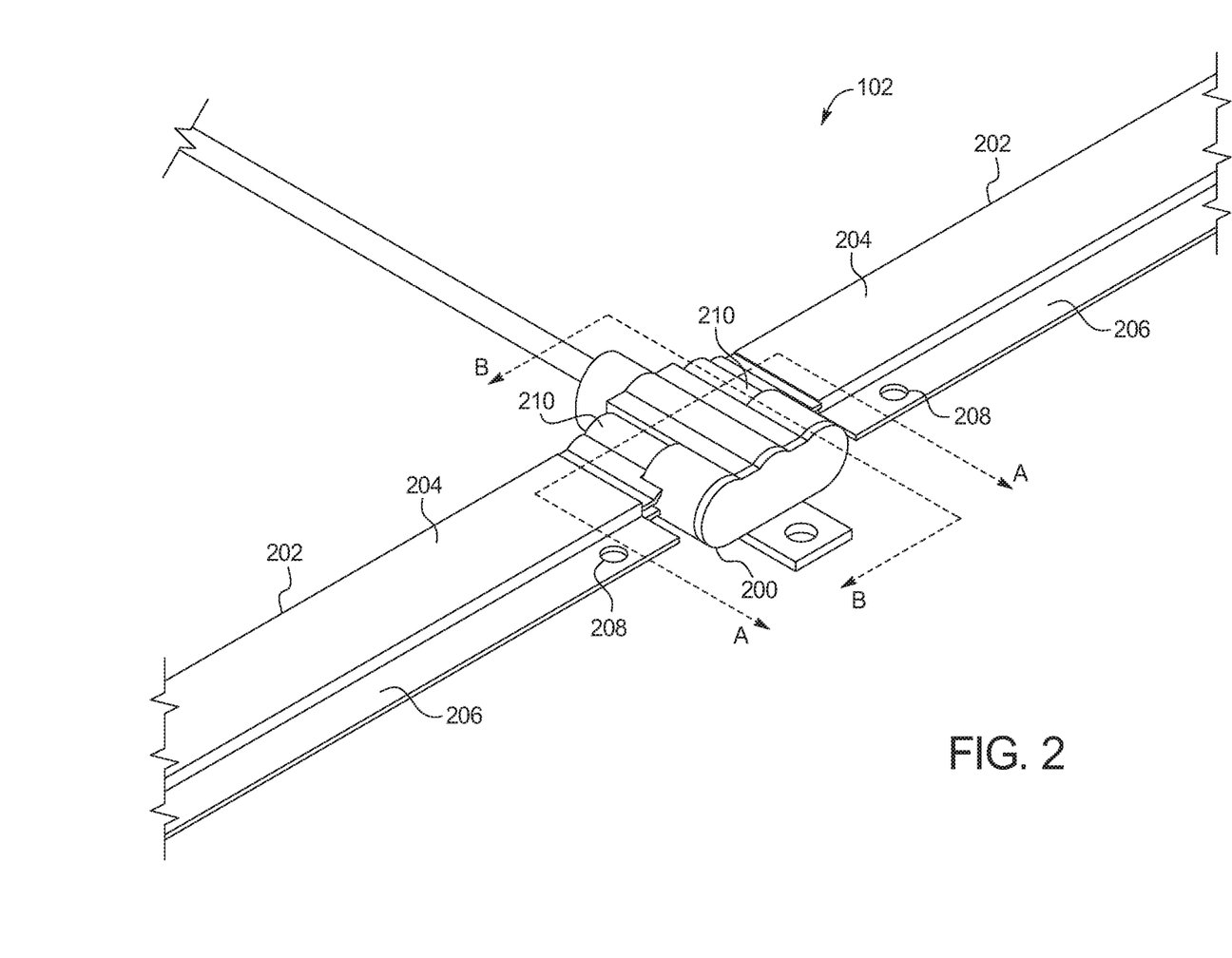
FIG. 2 illustrates the hinged joint of the hinged low profile modular electrical power bar of FIG. 1.
Figure 9A:
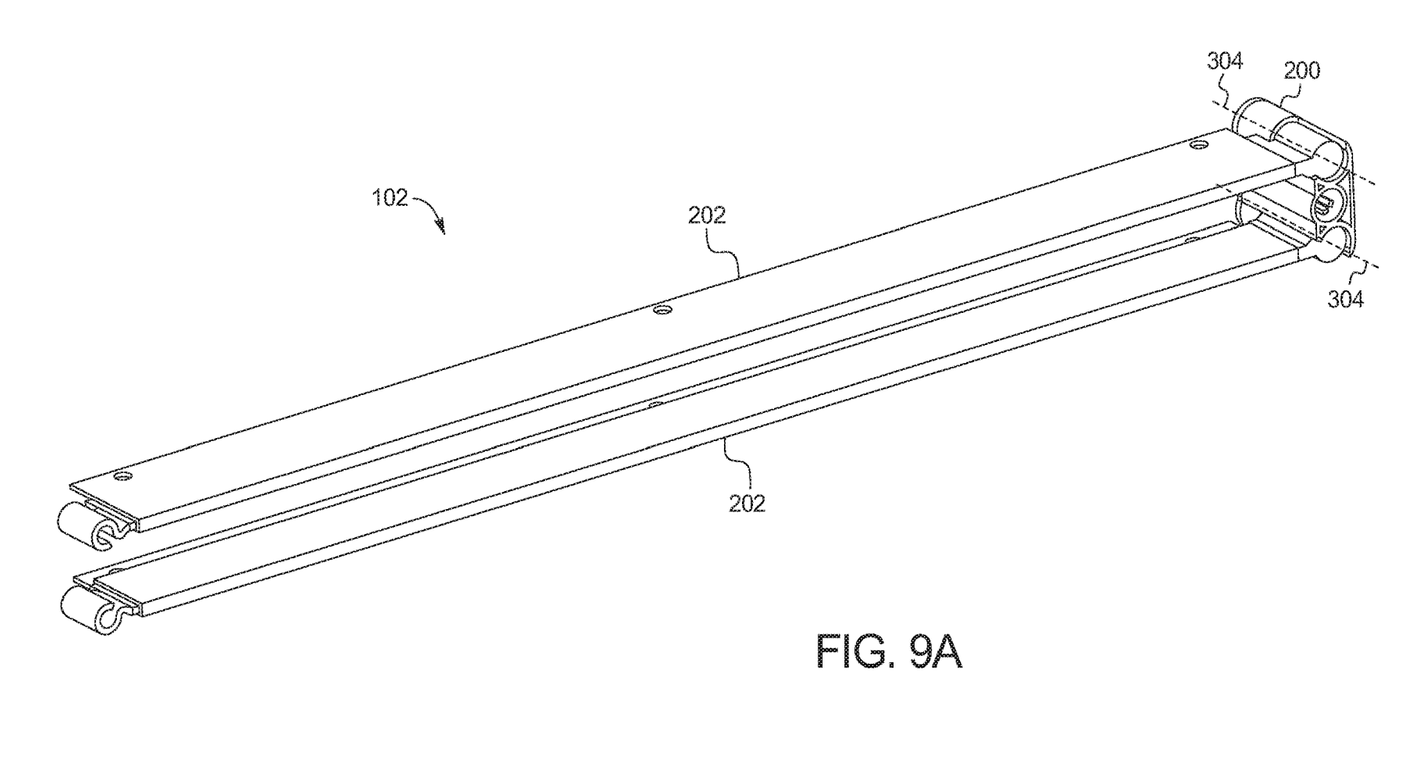
FIGS. 9A and 9B illustrate the hinged low profile modular electrical power bar of FIG. 1 in a folded configuration.
Figure 9B:
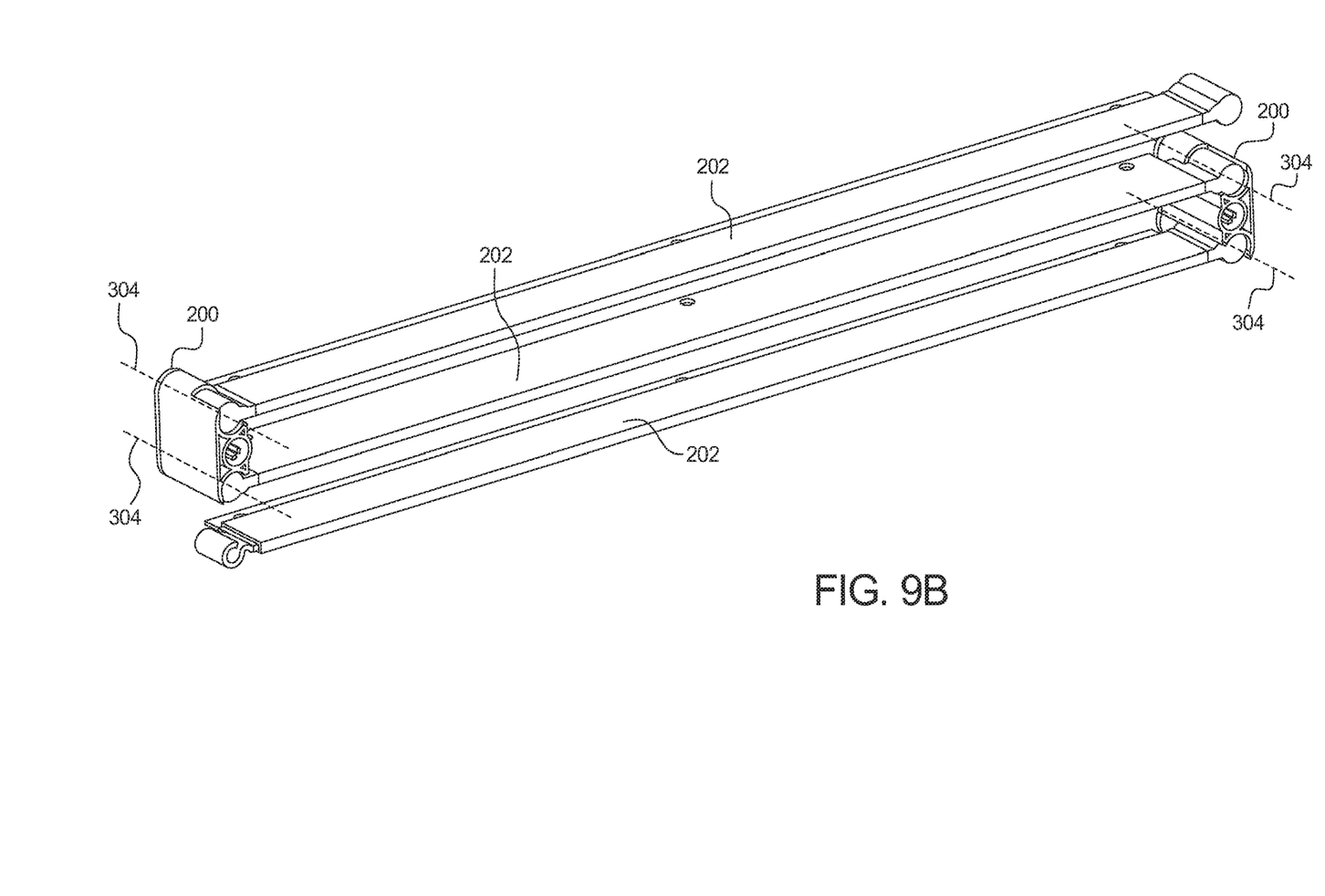

FIG. 2 illustrates a hinged joint 200 of the modular electrical power bar 102 of FIG. 1. In the illustrated example, the hinged joint 200 mechanically and electrically couples two insulated bus bars 202. The insulated bus bar 202 includes a body 204 and a flange 206. The body 204 includes a core made of an electrically conductive material (e.g., copper, etc.). The body 204 also includes an insulation layer made of an electrically insulating material (e.g., polyvinyl chloride, polypropylene, polyurethane, nylon, silicone etc.) that partially covers the core. In some examples, the insulated bus bar 202 includes an outer jacket layer that partially covers the insulation layer to protect the core and the insulation layer from damage. In some examples, the insulation layer and the outer jacket layer are the same layer. The flange 206 is integrally formed from the insulation layer or the outer jacket layer and extends from the body 204. The flange defines one or more mounting holes 208. The mounting hole(s) 208 provide a connection point to secure the modular electrical power bar 102 to the vehicle 100. When connected to the hinged joint 200, the insulated bus bars 202 rotate around a joint 210 between a flat position (as shown in FIG. 2) to a position perpendicular to the flat position (as shown in FIGS. 9A and 9B below). The insulated bus bars 202 are sized to fit within the allotted space in the vehicle 100. For example, the insulated bus bars 202 may be twenty-two millimeters wide (e.g., including the body 204 and the flange 206) by 398 millimeters long.

Figure 3:
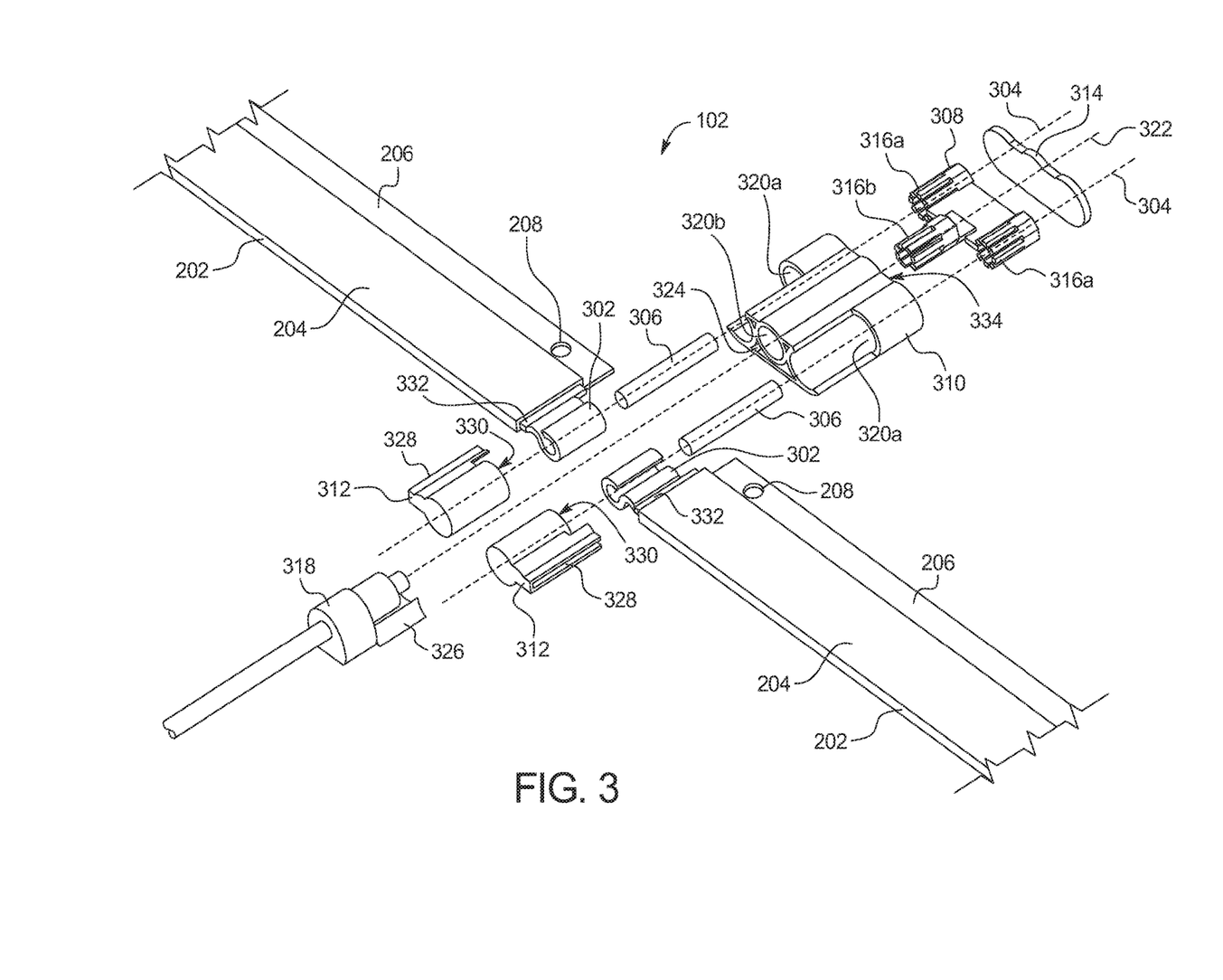
FIG. 3 is an exploded view of a hinged joint of FIG. 2.

FIG. 3 is an exploded view of the hinged joint 200 of FIG. 2. As illustrated in FIG. 3, the insulated bus bars 202 includes a terminal 302 extending from the insulated bus bars 202. The terminal 302 is integrally formed from the electrically conductive core of the insulated bus bars 202. The terminal 302 forms a circular or semi-circular cross-section along a connection axis 304. The terminal 302 defines a cavity configured to receive an electrically conductive coupling pin 306 of the hinged joint 200 along the connection axis 304. The inner diameter of the terminal 302 and the outer diameter of the coupling pin 306 are configured to facilitate rotation while maintaining the electrical connection.

In the illustrated example, the hinged joint 200 includes the coupling pin(s) 306, a connector 308, a insulating jacket 310, rotation caps 312, and an end cap 314. The connector 308 is made from an electrically conductive material. The connector 308 defines multiple sockets 316a and 316b. The pin sockets 316a are configured to receive a first end of the coupling pin 306. In the illustrated example, the coupling pins 306 fits within the pin sockets 316a along the connection axes 304 that each run longitudinally through the respective coupling pins 306. In the illustrated example, the connector 308 has two pin sockets 316a. Alternatively, in some examples, the connector 308 has one pin socket 316a (e.g., on a terminal hinged joint 200 that connects to one insulated bus bar 202). When the hinged joint 200 is assembled, the first end of the coupling pins 306 is disposed within the pin socket 316a along the connection axis 304. A second end of the coupling pin 306 is configured to fit within the terminal 302 of the insulated bus bars 202. In some examples, the second end of the coupling pin 306 is press fit into the terminal 302. A power feed socket 316b is configured to receive a pin of a power connector 318 (sometimes referred to as a "power plug") that electrically couples one or more subsystems of the vehicle 100 to the power system of the vehicle 100 via the modular electrical power bar 102.

The insulating jacket 310 is made of an electrical insulating material. The insulating jacket 310 is configured to house the connector 308. The insulating jacket 310 defines first and second chambers 320a and 320b. The first chamber(s) 320a extend(s) a portion of the length of the insulating jacket 310. The pin socket 316a fits within the first chamber 320a along the connection axis 304. In the illustrated example, the second chamber 320b extends the entire length of the insulating jacket 310. The power feed socket 316b fits within the second chamber 320b along a central axis 322. When the hinged joint 200 is assembled, the connector 308 is disposed within the insulating jacket 310. Additionally, as discussed below, the insulating jacket 310 defines a keyhole 324 to receive a keying feature 326 of the power connector 318.

The rotation caps 312 facilitate the rotation of the insulated bus bars 202 in relation to the hinged joint 200. The rotation caps 312 are made of an electrically insulating material. In the illustrated example, the rotation caps 312 define a slot 328 and a cavity 330. The slot 328 is configured to receive the a portion 332 of the core of the insulated bus bars 202 that extends beyond the body 204 of the insulated bus bars 202. The cavity 330 is configured to receive the terminal 302 of the insulated bus bars 202.

The end cap 314 is configured to fit within an end 334 of the insulating jacket 310 to protect the connector 308 from debris and conducting material. The end cap 314 is made from an insulating material. The end 334 is the end in which, when the hinged joint 200 is assembled, the connector 308 is inserted into the insulating jacket 310.

Figure 4:
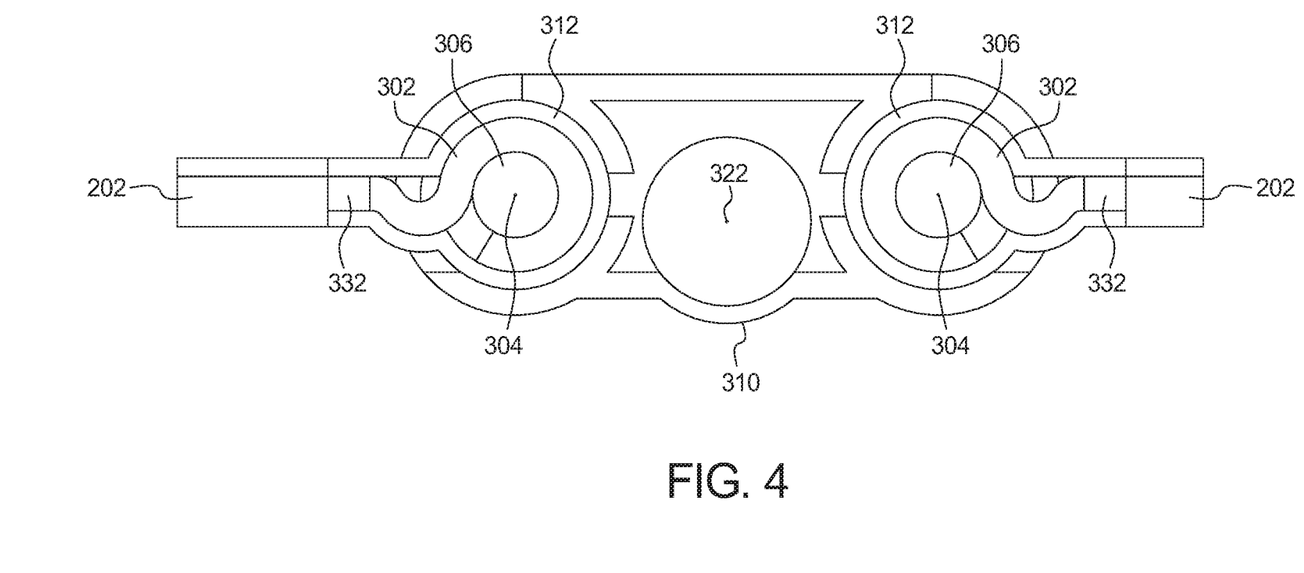
FIG. 4 is a cross-sectional view of the hinged joint of FIG. 2.

FIG. 4 is a cross-sectional view perpendicular to the axes 304 and 322 of the hinged joint 200 of FIG. 2. The cross-sectional view is along the line A-A in FIG. 2 with the hinged joint 200 assembled. In the illustrated example, the coupling pin 306 is disposed within the terminal 302. The terminal 302 is disposed within the cavity 330 of the rotation cap 312. The portion 332 of the core of the insulated bus bars 202 is disposed within the slot 328 of the rotation cap 312.

Figure 5:
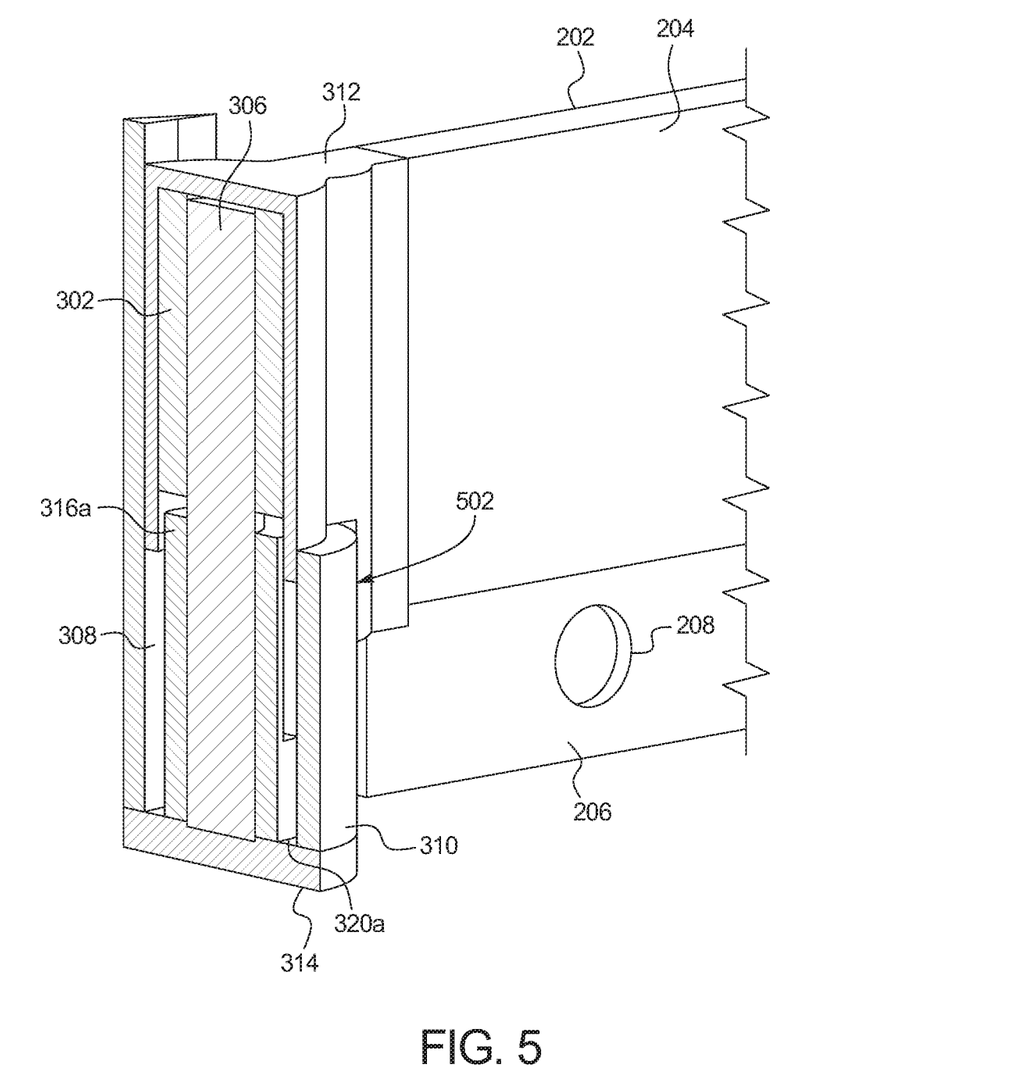
FIG. 5 is a cross-section of the hinged joint of FIG. 2.

FIG. 5 is a cross-sectional view parallel to the axes 304 and 322 of the hinged joint 200 of FIG. 2. The cross-sectional view is along the line B-B of FIG. 2 with the hinged joint 200 assembled. In the illustrated example, the coupling pin 306 is disposed within the terminal 302 and the pin socket 316a of connector 308. The pin socket 316a of connector 308 is disposed within the first chamber 320a of the insulating jacket 310. The terminal 302 is disposed within the rotation cap 312. Additionally, a portion of the pin socket 316a of connector 308 is disposed in the rotation cap 312. The portion 332 of the core of the insulated bus bars 202 is disposed within the slot 328 of the rotation cap 312. In the illustrated example, the rotation cap 312 defines a second slot 502 in which the insulating jacket 310 is disposed. The second slot 502 facilitates the rotation cap 312 and the corresponding insulated bus bars 202 to rotate partially around the corresponding connection axis 304.

Figure 6:
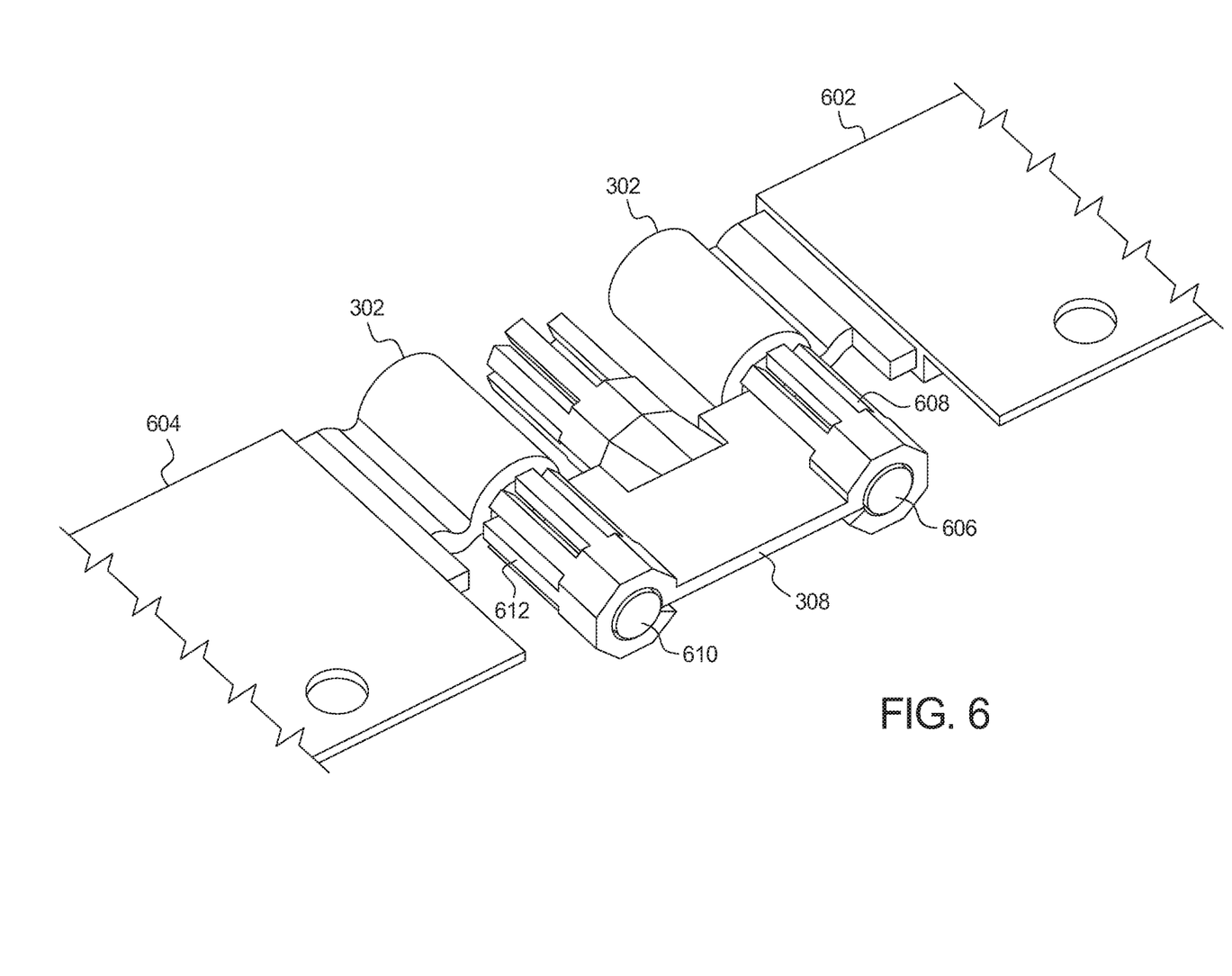
FIG. 6 illustrates the electrical components of the hinged joint of FIG. 2.

FIG. 6 illustrates the electrical components of the hinged joint 200 of FIG. 2 that form the electrical connection between two bus bars 602 and 604. The bus bars 602 and 604 of FIG. 6 are examples of the insulated bus bars 202 of FIGS. 2, 3, 4, and 5. In the illustrated example, a first coupling pin 606 is disposed within the terminal 302 of the first bus bar 602 and a first pin socket 608 of the connector 308 to electrically couple the first bus bar 602 to the connector 308. A second coupling pin 610 is disposed within the terminal 302 of the second bus bar 604 and a second pin socket 612 of the connector 308 to electrically couple the second bus bar 604 to the connector 308. In such a manner the first bus bar 602 is electrically coupled to the second bus bar 604.

Figure 7:
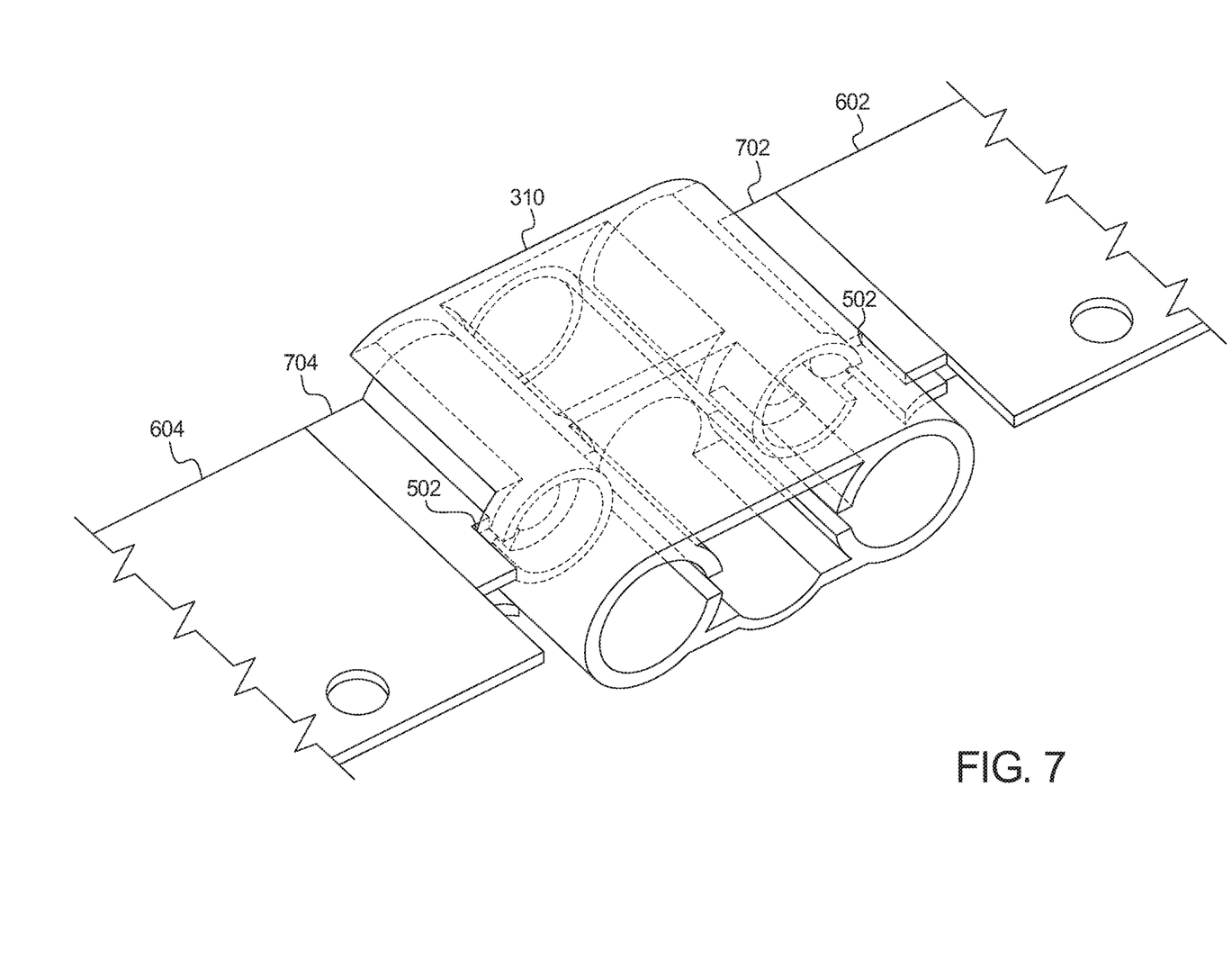
FIG. 7 illustrates the mechanical components of the hinged joint of FIG. 2.

FIG. 7 illustrates the mechanical components of the hinged joint 200 of FIG. 2 that form the mechanical connection between two bus bars 602 and 604. The rotating caps 702 and 704 are examples of the rotating caps 312 of FIGS. 3, 4, and 5. A portion of the core of the first bus bar 602 that extends beyond the insulating and/or protective layer(s) is disposed within the slot of the first rotating cap 702. To rotatably couple the first bus bar 602 to the insulating jacket 310, a portion of the first rotating cap 702 is disposed within one of the first chambers 320a of the insulating jacket 310 and a portion of the insulating jacket 310 is disposed within the second slot 502 of the first rotating cap 702. To rotatably couple the second bus bar 604 to the insulating jacket 310, a portion of the second rotating cap 704 is disposed within the other one of the first chambers 320a of the insulating jacket 310 and a portion of the insulating jacket 310 is disposed within the second slot 502 of the second rotating cap 704.

Figure 8A:
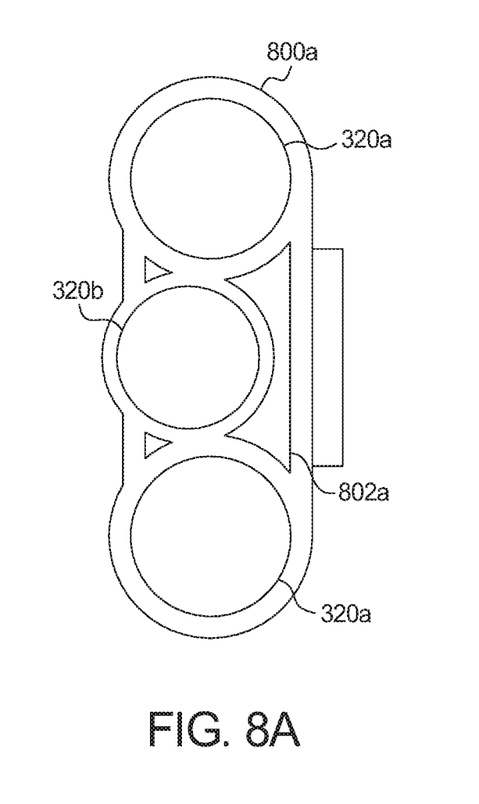
FIGS. 8A, 8B, and 8C are front views of the keyed insulation jacket of the hinged joint of FIG. 2.
Figure 8B:
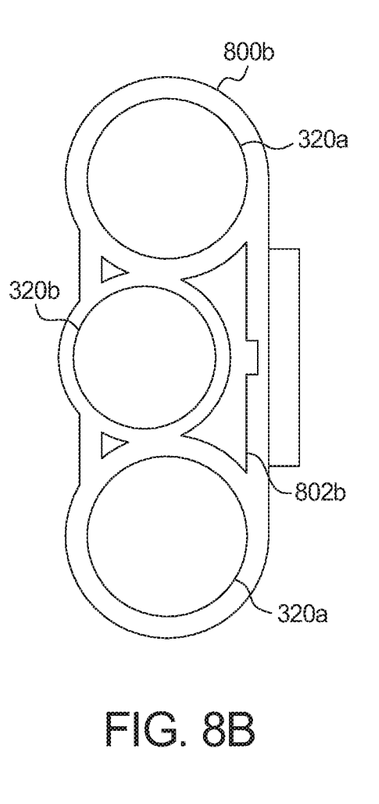
Figure 8C:
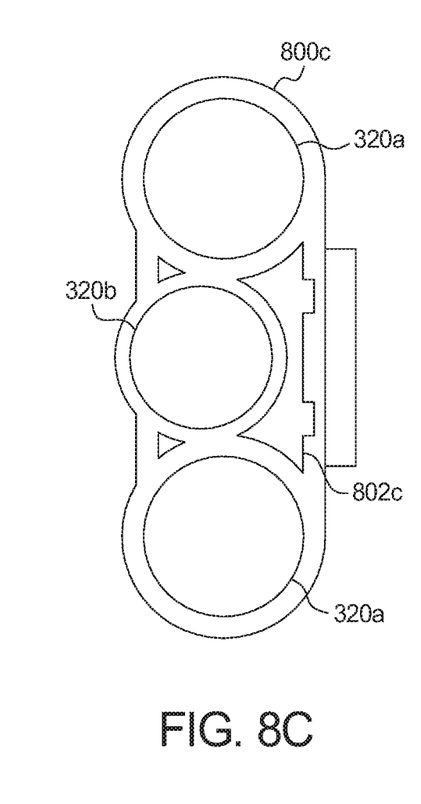

FIGS. 8A, 8B, and 8C are front views of keyed insulation jackets 800a, 800b and 800c of the hinged joint 200 of FIG. 2. The keyed insulation jackets 800a, 800b and 800c are examples of the insulating jacket 310 of FIG. 3, 4, 5, and 7. The keyed insulation jackets 800a, 800b and 800c define keyholes 802a, 802b, 802c that correspond to keying features 326 of different power connectors 318. The keying features 326 and the corresponding keyholes 802a, 802b, 802c are configured to that different hinged low profile modular electrical power bars 102 in the same vehicle 100 have different keyholes 802a, 802b, 802c defined by the keyed insulation jackets 800a, 800b and 800c. For example, a hinged low profile modular electrical power bar 102 for a 12V power bus may have a first keyhole 802a, a hinged low profile modular electrical power bar 102 for a 48V power bus may have a second keyhole 802b, and a hinged low profile modular electrical power bar 102 for a ground return may have a third keyhole 802c. The keying features 326 of the power connectors 318 and the keyholes 802a, 802b, 802c of the hinged joint 200 of the hinged low profile modular electrical power bars 102 in the same vehicle 100 are configured so that the power connectors 318 associated with one power bus (e.g., a 12V power bus, etc.) cannot be plugged into the hinged joint 200 associated with another power bus (e.g., a 48V power bus, etc.) In this manner, electrical subsystems of the vehicle 100 are not coupled to the wrong power bus.

FIGS. 9A and 9B illustrate the hinged low profile modular electrical power bar 102 of FIG. 1 in a folded configuration. In the illustrated example of FIG. 9A, the hinged low profile modular electrical power bar 102 includes two insulated bus bars 202 are rotated about the connection axes 304 of the hinged joint 200 so that the bus bars are parallel. In FIG. 9B, the hinged low profile modular electrical power bar 102 includes two hinged joints 200 and three insulated bus bars 202. The insulated bus bars 202 are rotated about the connection axes 304 of the corresponding hinged joint 200 so that the bus bars are parallel.

Figure 10:
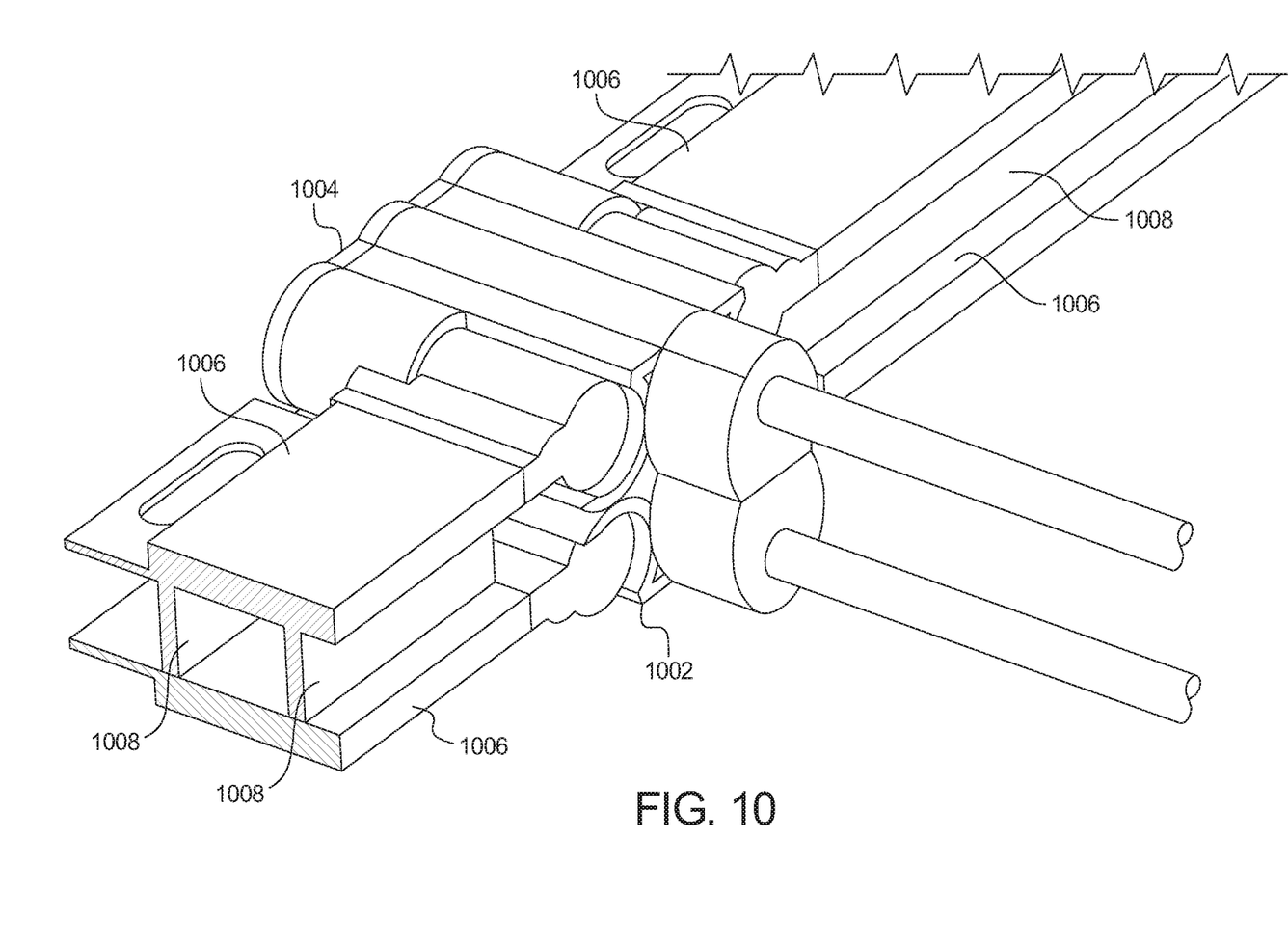
FIG. 10 illustrates two hinged low profile modular electrical power bars of FIG. 1 for different power buses stacked together.

FIG. 10 illustrates two hinged low profile modular electrical power bars 1002 and 1004 for different power buses stacked together. The hinged low profile modular electrical power bars 1002 and 1004 are examples of the hinged low profile modular electrical power bar 102 of FIG. 1. In the illustrated example, the hinged low profile modular electrical power bars 1002 and 1004 are stacked while installed in the vehicle 100, but are separable and foldable individually for storage and shipping. In the illustrated example, one of the hinged low profile modular electrical power bars 1004 include bus bars 1006 that include legs 1008 integrally formed from the body of the bus bars 1006. The legs 1008 provide stability when the hinged low profile modular electrical power bars 1002 and 1004 are stacked when installed.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle power bar comprising:
a connector including first, second, and third sockets;
first and second pins;
a first busbar rotatably coupled to the connector via the first pin coupled to a first terminal of the first busbar and inserted into the first socket;
a second busbar rotatably coupled to the connector via the second pin coupled to a second terminal of the second busbar and inserted into the second socket; and
an insulating jacket defining first, second, and third chambers, the connector disposed within the insulating jacket with the first socket in a first chamber, the second socket in a second chamber, and the third socket in the third chamber.

2. The vehicle power bar of claim 1, wherein the first busbar is electrically coupled to the second busbar via the connector and the first and second pins.

3. The vehicle power bar of claim 1, wherein the first terminal is integrally formed from a first conductive core of the first busbar, and the second terminal is integrally formed from a second conductive core of the second busbar.

4. The vehicle power bar of claim 1, wherein the first and second busbars have non-conductive bodies.

5. The vehicle power bar of claim 4, wherein the bodies have flanges that define mounting holes.

6. The vehicle power bar of claim 4, wherein the bodies have legs extending perpendicular to the bodies.

7. The vehicle power bar of claim 1, wherein the insulating jacket defines a keyhole aligned with the third chamber.

8. The vehicle power bar of claim 7, wherein the keyhole facilitates mating of a power plug with a matching keying feature with the third socket within the third chamber and prevents mating of the power plug with a different keying feature.

9. The vehicle power bar of claim 1, including first and second rotation caps coupled to the first and second busbars respectively.

10. The vehicle power bar of claim 9, wherein the first rotation cap covers the first terminal and partially covers the first socket within the first chamber, and the second rotation cap covers the second terminal and partially covers the second socket within the second chamber.

11. The vehicle power bar of claim 9, the first and second rotation caps are configured to facilitate rotating the first and second busbars about longitudinal axes define by the respective ones of the first and second pins.

12. The vehicle power bar of claim 9, wherein the first and second rotation caps and the insulating jacket mechanically couple the first and second busbars, and the first and second pins and the connector electrically couple the first and second busbars.

13. The vehicle power bar of claim 1, wherein the first and second pins are press fit into the first and second terminals respectively.

14. A foldable power bar comprising:
a connector including first, second, and third sockets;
a first busbar including a first terminal;
a second busbar including a second terminal;
an insulating jacket defining first, second, and third chambers, the connector disposed within the insulating jacket with the first socket in first chamber, the second socket in the second chamber, and the third socket in the third chamber;
a first pin coupled to the first terminal and inserted into the first socket; and
a second pin coupled to the second terminal and inserted into the second socket, the first and second pins to maintain conduction between the first and second busbars via the connector when rotated in the first and second sockets.

15. The foldable power bar of claim 14, including:
first and second rotation caps coupled to the first and second busbars respectively, the first rotation cap cover the first terminal and partially covering the first socket within the first chamber and, the second rotation cap cover the second terminal and partially covering the second socket within the second chamber, the first and second rotation caps configured to facilitate rotating the first and second busbars about longitudinal axes define by the respective ones of the first and second pins.

16. The foldable power bar of claim 15, wherein the insulating jacket defines a keyhole aligned with the third chamber, the keyhole facilitating mating of a power plug with a matching keying feature with the third socket within the third chamber and prevents mating of the power plug with a different keying feature.

17. The foldable power bar of claim 15, wherein the first and second rotation caps and the insulating jacket mechanically couple the first and second busbars, and the first and second pins and the connector electrically couple the first and second busbars.

18. The foldable power bar of claim 14, wherein the first busbar includes a first non-conductive body and a first conductive core partially disposed within the first non-conductive body, the first non-conductive body including a first flange that defines a first mounting hole, and the first terminal being integrally formed from a first portion of the first conductive core that extends beyond the first non-conductive body; and wherein the second busbar includes a second non-conductive body and a second conductive core partially disposed within the second non-conductive body, the second non-conductive body including a second flange that defines a second mounting hole, and the second terminal being integrally formed from a second portion of the second conductive core that extends beyond the second non-conductive body.

19. A connector assembly comprising:
a connector including first, second, and third sockets
an insulating jacket defining first, second, and third chambers, the connector disposed within the insulating jacket with the first, second, and third sockets in the first, second, and third chambers respectively;
a first pin rotatably and electrically connecting a first bus bar to the first socket; and
a second pin rotatably and electrically connecting a second bus par to the second socket.

* * * * *